Oct. 31, 1950     G. R. MARLETTE     2,528,067
WRAP STRIPE AND PLATING MECHANISM AND METHOD
Filed Aug. 14, 1947     9 Sheets-Sheet 1

INVENTOR.
GOLEY R. MARLETTE

Oct. 31, 1950 G. R. MARLETTE 2,528,067
WRAP STRIPE AND PLATING MECHANISM AND METHOD
Filed Aug. 14, 1947 9 Sheets-Sheet 3

GOLEY R. MARLETTE
*INVENTOR.*
BY

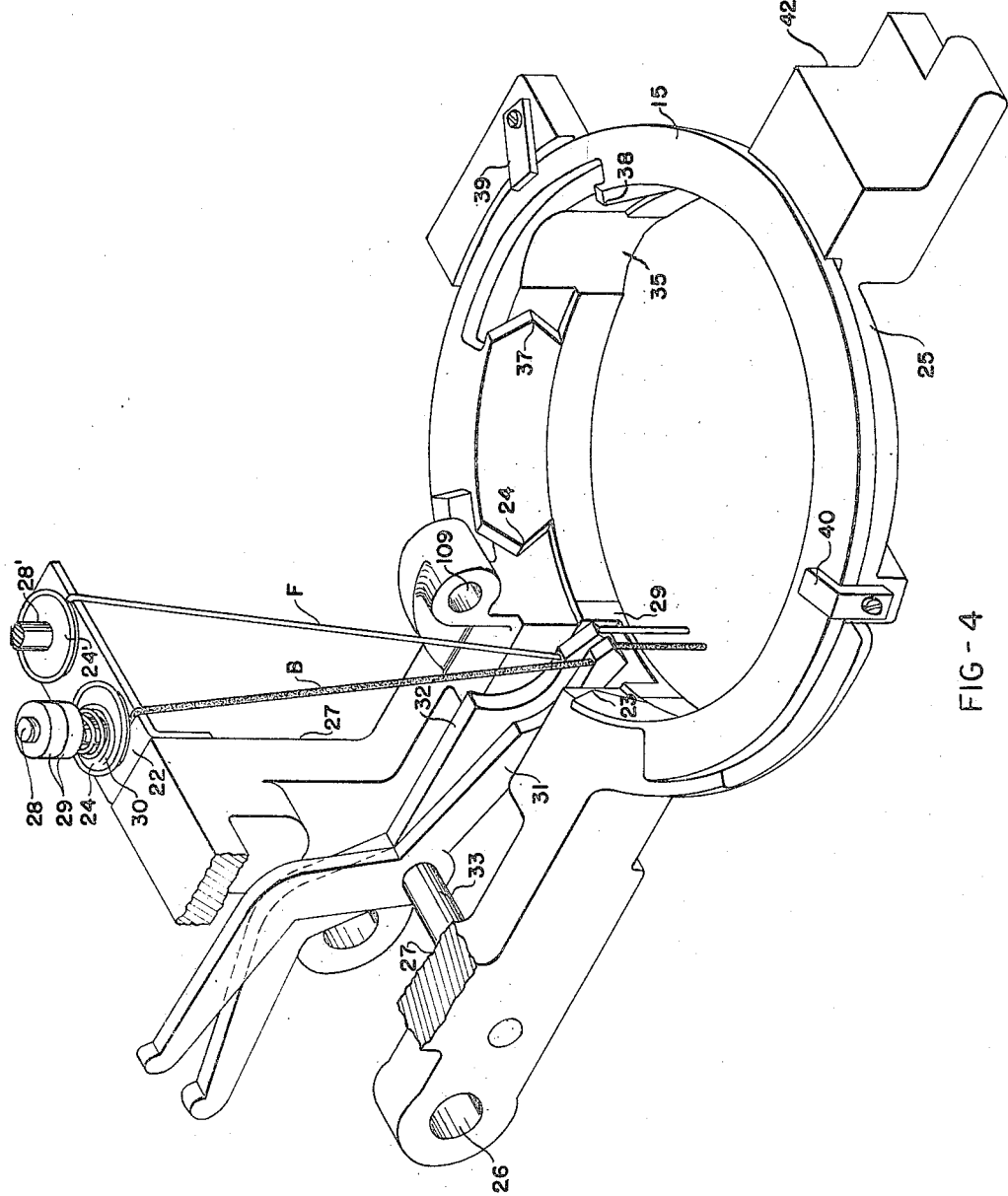

Oct. 31, 1950            G. R. MARLETTE            2,528,067
WRAP STRIPE AND PLATING MECHANISM AND METHOD
Filed Aug. 14, 1947            9 Sheets-Sheet 5
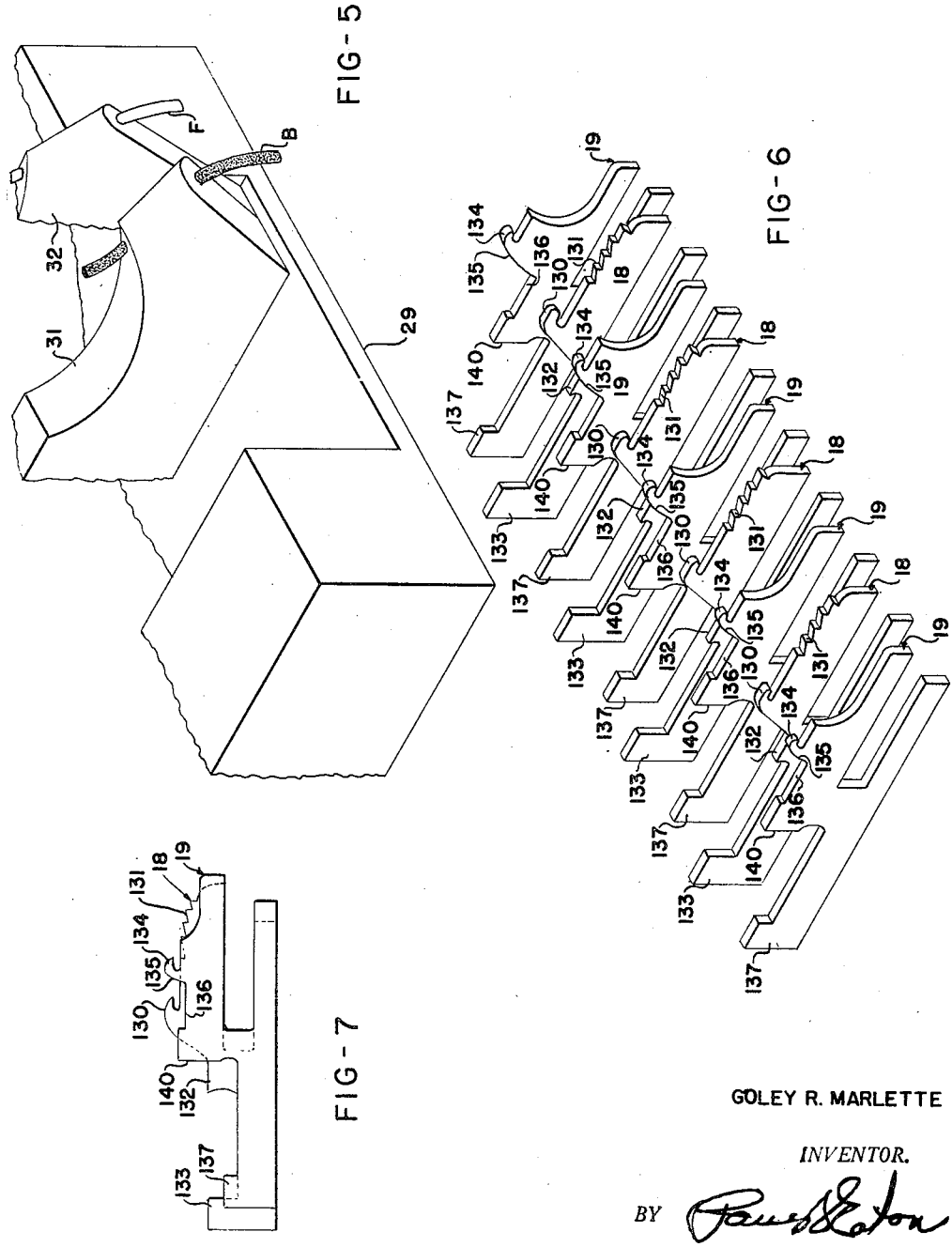
GOLEY R. MARLETTE
*INVENTOR.*

Oct. 31, 1950          G. R. MARLETTE          2,528,067
WRAP STRIPE AND PLATING MECHANISM AND METHOD
Filed Aug. 14, 1947          9 Sheets-Sheet 6

INVENTOR.
GOLEY R. MARLETTE

Oct. 31, 1950       G. R. MARLETTE      2,528,067
WRAP STRIPE AND PLATING MECHANISM AND METHOD
Filed Aug. 14, 1947                9 Sheets-Sheet 7
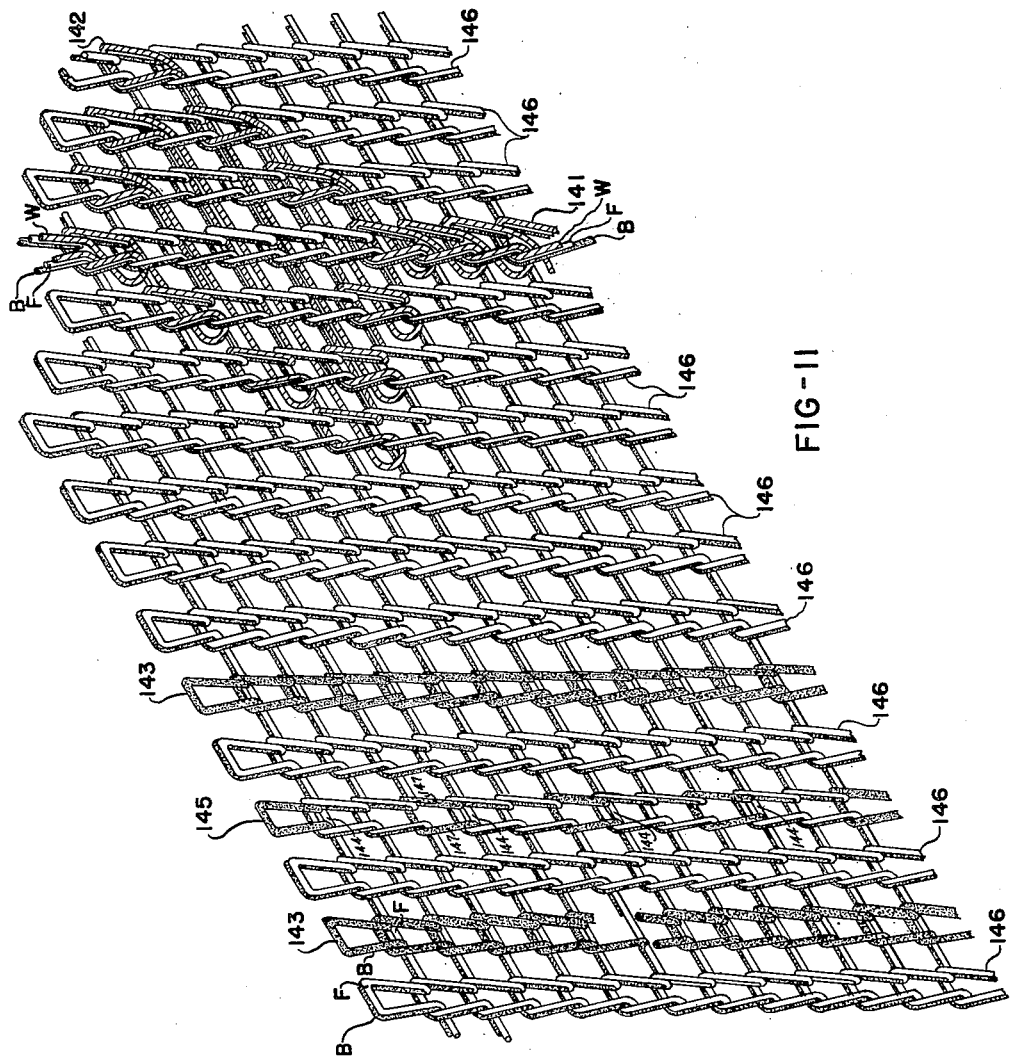
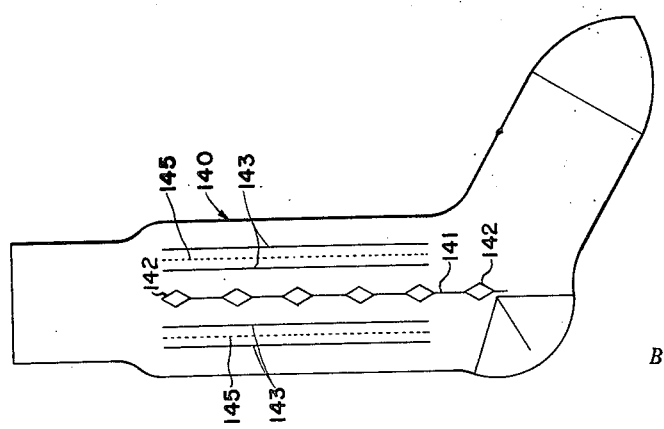
GOLEY R. MARLETTE
*INVENTOR.*
BY Oct. 31, 1950  G. R. MARLETTE  2,528,067
WRAP STRIPE AND PLATING MECHANISM AND METHOD
Filed Aug. 14, 1947  9 Sheets-Sheet 8

GOLEY R. MARLETTE
INVENTOR.
BY

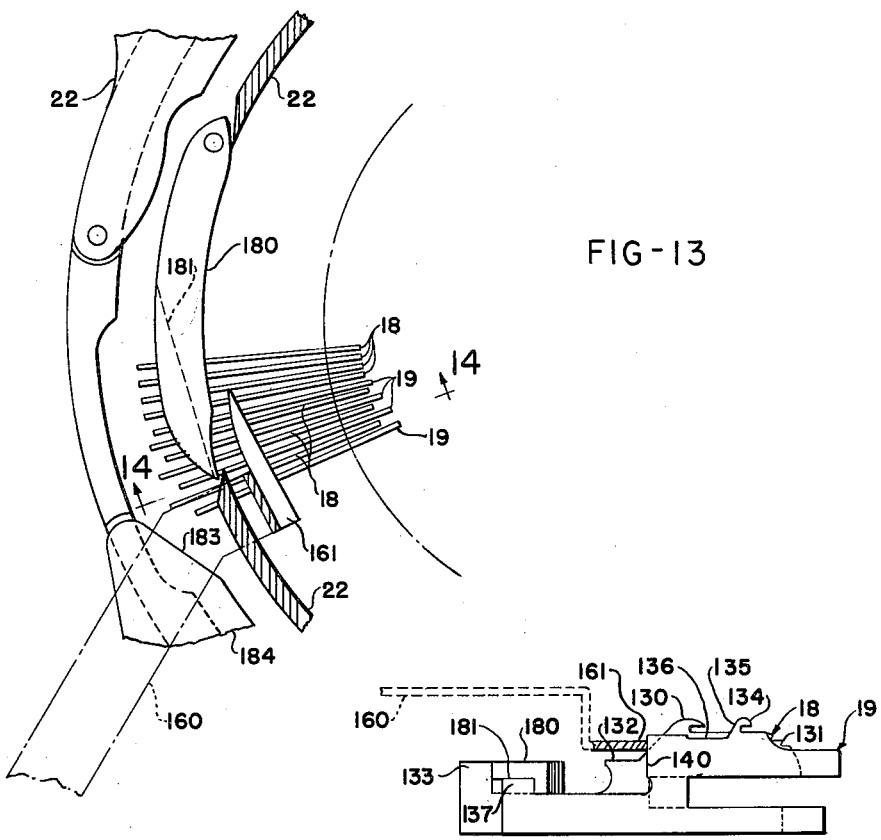
FIG-13
FIG-14
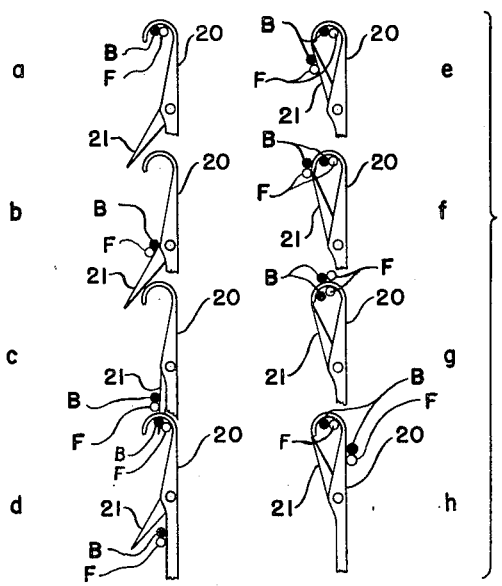
FIG-15
GOLEY R. MARLETTE
*INVENTOR.*

Patented Oct. 31, 1950

2,528,067

UNITED STATES PATENT OFFICE 2,528,067

WRAP STRIPE AND PLATING MECHANISM AND METHOD

Goley R. Marlette, High Point, N. C., assignor to Adams-Millis Corporation, High Point, N. C., a corporation of North Carolina Application August 14, 1947, Serial No. 768,687

10 Claims. (Cl. 66—135)

This invention relates to a circular knitting machine and more especially to a circular knitting machine being equipped with wrap feeding means for feeding wrap threads to selected needles and also equipped with special sinkers and a peculiar manner of feeding the backing yarns and facing yarns so that the backing yarn is fed under high tension while the facing yarn is fed with lesser tension, thus causing the facing yarn not to bind or imbed itself in the backing yarn and causing it to stand out more clearly in the making of patterns and the like.

Also, the backing yarn being fed under high tension, in the event that a wrap thread is deposited around certain needles, it causes the wrap thread to stand out in front of the facing yarn since the wrap thread will not be under as great a tension as the facing yarn, and the backing yarn being under high tension will therefore not interfere with the standing out of the wrap thread when such is used in certain wales of courses of the stocking.

Another important object of the invention is to provide a reverse plating sinker and means for operating the same whereby every other sinker will engage both the backing yarn and the facing yarn below their nibs to aid in a shedding of the loops while the other sinkers, being provided with an outwardly and downwardly sloping portion on the outer portion of its nibs, will cause the backing yarn and facing yarn and the wrap yarn, when used, to be slid down the sloping surface of the shoulders of the nibs and to thus cause the backing yarn to be on the outer-most portion of the tops of the sinkers during the final drawing of the stitches while the facing yarns and the wrap yarns, when used, will appear next to the shoulders of the nibs of the sinkers and thus will stand out boldly and distinctly and under less tension on the surface of the fabric being knitted.

Some of the objects of the invention having been stated, other objects will appear as the description proceeds when taken in connection with the accompanying drawing in which Figure 1 is an elevation of the upper portion of the cylinder of a knitting machine and showing a wrap attachment associated therewith, and showing the manner in which the sinkers are positioned;

Figure 4 is an isometric view of the latch ring and gap closer assembly and showing the two feed fingers for the backing and facing yarns as employed in this invention;

Figure 5 is an isometric view of the throat plate and the two special fingers for feeding the facing and backing yarns;

Figure 6 is an isometric view showing the position of the sinkers in one stage of the knitting operation;

Figure 7 is an elevation looking at the left-hand end of Figure 6 and showing the relative positions of the first two sinkers;

Figure 10 is an elevation showing schematically a type of stocking and patterning effected by the apparatus;

Figure 11 is an isometric view of a portion of the fabric produced by the apparatus herein shown and described and showing portions thereof broken away;

Figure 13 is a plan view, with parts broken away, showing the cams for operating all of the sinkers;

Figure 14 is a vertical sectional view taken along line 14—14 in Figure 13;

Figure 15 is a view showing progressively the shedding of the loops by the needles.

Figure 1:
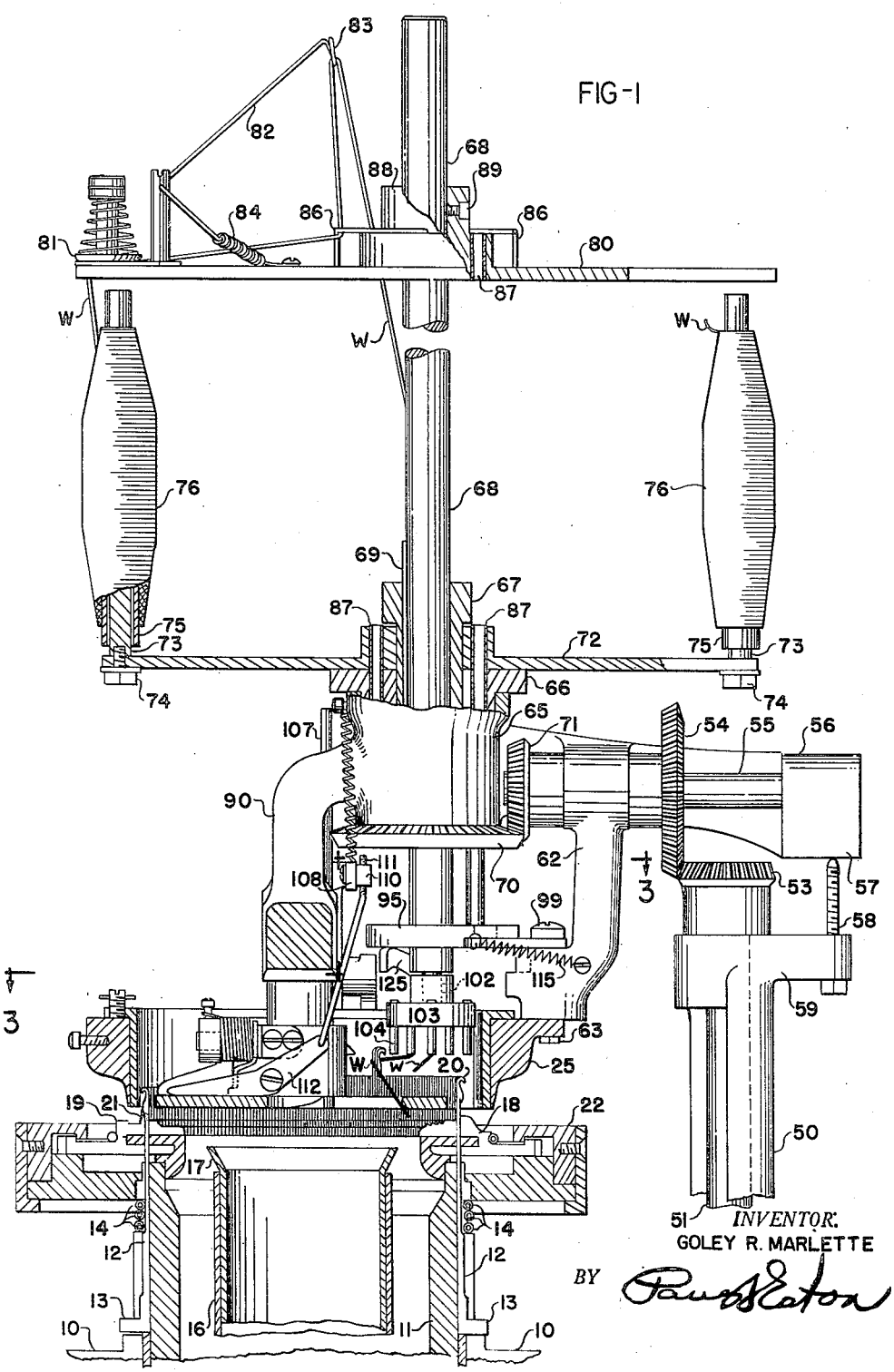

Referring more specifically to the drawings, the numeral 10 indicates a portion of the bed plate of a knitting machine in which a cylinder 11 is rotatably mounted. This cylinder 11 has a plurality of vertically disposed grooves in which a plurality of needles 12 having butts 13 thereon are mounted for movement. Certain of these needles have a jack for operating the same so that certain of the needles may be raised to a higher elevation to take wrap threads, but such mechanism is not shown as it is conventional, as shown in Patent 1,906,204 of April 25, 1933. These needles are held in their grooves in a conventional manner by conventional endless tension springs 14.

Disposed within the cylinder is a conventional sleeve 16 having a telescopic portion 17 and through which the knitted stocking feeds downwardly during a knitting operation. The knitting machine is equipped with a sinker ring 22 in which a plurality of saw tooth sinkers 18 are mounted for radial movement as well as a plurality of reverse plating sinkers 19 having outwardly and downwardly sloping shoulders on the rear portions of their nibs. These needles are conventional latch needles having a hook 20 on their upper ends and a suitable latch 21 adapted to be closed on downward movement of the needles through the fabric.

The knitting machine is also equipped with a latch ring 25 pivoted as at 26 to uprising conventional projection 27. The latch ring 25 oscillatably confines therein a gap closer ring 15 having cam portions 23 and 24 disposed on each side of the throat plate 29. The throat plate 29 and the latch ring 25 have coinciding gaps therein which is conventional and in which the backing yarn finger 31 and facing yarn finger 32 are disposed. The facing yarn feed finger 32 is positioned against the lead side of the throat plate gap and the backing yarn feed finger 31 has its lead side positioned against the proximate side of the facing yarn feed finger 32, but the feed eye of facing yarn feed finger 32 is at a higher elevation than the feed eye of the backing yarn feed finger 31. This allows partially lowered float needles to pass under the facing yarn to make stripes 143 in Figure 11 or any other desired pattern, knitted from the backing yarn only. This also causes the backing yarn to be placed lower than the facing yarn on the shanks of the needles, which position is reversed when knitting takes place on the back slope of the nibs of the reserve sinkers. These fingers are pivotally mounted on a pivot 33 disposed between the two side portions of the latch ring which are pivoted as at 26. These fingers 31 and 32 have their ends next to the needles raised and lowered in a feeding operation by a conventional push rod engaging the outer end of the same which is conventional and is not shown.

The latch ring 25 is cut away as at 35 for accommodating a wrapping disk or tubes extending therefrom which will be presently explained. It is often times not necessary to cut this latch ring away as at 35, but in the event that it is cut away, then it is necessary to cut away the gap closer also, and by cutting away the gap closer, cammed portions 37 and 38 are provided for preventing injury to the latches of the needle and preventing their entering the cavity 35 during reciprocatory knitting.

The gap closer is loosely confined in position by any suitable means such as clips 39 and 40 as is conventional. The latch ring has a projection 42 having a pin 43 therein adapted to engage a spring clip 44 rising up from the bedplate of the machine to clamp the latch ring in position. The sinker ring 17 has projections 45 and 46 with set screws 47 and 48 therein for regulating the position of the sinker ring as desired.

The backing yarn is indicated by reference character B while the facing yarn is indicated by reference character F. It is to be noted that the backing yarn is fed by a hole through the free end of this finger 31 at a lower level than the facing yarn which is unconventional.

The machine has rising upwardly therefrom a bracket 50 which has disposed inside thereof a rotary shaft 51 which has on its lower end a beveled gear, not shown, which meshes with a beveled gear, not shown, on a horizontally disposed shaft, which also has on said last-named shaft another beveled gear which meshes in turn with a large beveled gear secured on the cylinder for imparting rotation thereto such as shown in the patent to Dickens No. 2,278,869. This mechanism heretofore has been employed in some types of machines for driving the dial when the machine was equipped with a dial and dial needles.

On the upper end of shaft 51 is secured a beveled gear 53 which meshes with a beveled gear 54 secured on a shaft 55 rotatably mounted in a bracket 56. This bracket 56 has a block portion 57 which can be adjusted in position by means of a set screw 58 secured in an outwardly projecting portion 59 of bracket 50. The bracket 56 has integral therewith a downwardly projecting leg 62 which is secured to the latch ring 25 at its lower end by any suitable means such as a screw 63.

The bracket 56 also has integral therewith a hub portion 65 in which is rotatably mounted a bearing member or portion 66 having fitted therein a bearing 67 which has keyed therein for vertical sliding movement a wrap shaft 68. This keyed arrangement is shown as at 69. The bearing portion 66 has integral therewith a beveled gear 70 which meshes with a beveled gear 71 on the end of shaft 55.

Mounted on top of bearing portion 66 is a table 72 which has a plurality of cop holders 73 secured thereon by any suitable means such as screws 74, and each cop holder is adapted to receive a cop tube 75 having wrap yarn 76 secured thereon, the strands of wrap yarn eminating from these cops being indicated by W. There can be as many cops of wrap yarn as desired as in the drawings only two are shown as being used but as many as may be desired may be used.

The shaft 68 also has secured thereon a disk 80 and for each wrap yarn strand there is a conventional tension mechanism 81 and a tension takeup lever 82 having a hook 83 in its upper end and tensioned by a tension spring 84. The wrap yarn passes through a suitable ring 86 before it moves downwardly through suitable tubes 87 in a hub portion 88 of circular disk 80, which hub portion is secured to the shaft 68 by any suitable means such as a screw 89. The bearing member or portion 66 also has a plurality of these tubes 87 through which the wrap yarns pass.

Projecting from the hub portion 65 is a downwardly projecting arm 90 which is secured as at 91 to the latch ring 25 to thus properly support the wrap stripe mechanism. Disposed below and fixedly secured to the wrap shaft 68 is a gear 70 and fixedly secured to the wrap shaft 68 is a disk member 95 having a cam portion 96 thereon which is adapted to engage the end 97 of a lever 98 pivoted as at 99 on portion 62.

The disk 95 has a plurality of vertically disposed holes 101 through which the wrap threads pass on their way to the needles. The lower end of the wrap shaft 68 has secured thereon by any suitable means such as a set screw 102 a wrap disk 103 having a plurality of vertically disposed tubes 104 penetrating the same, and projecting downwardly in close proximity to the needle circle but being normally disposed above the upper ends of the normally raised needles but below the needles raised to take the wrap yarns.

The lever 98 has rising upwardly therefrom a rod 105 which has an outturned portion 106 on its upper end adapted to engage the lever 107 welded to a lever 108 which is pivoted as at 109, and which is operated by oscillation of the lever 98 by engagement with cam 96. This lever 108 has secured thereto as at 110 a link 111 which projects downwardly and is secured to one end of a conventional clamp and cutter assembly 112 so that when the wrap disk 103 is in lowermost position it will operate the clamp and cutter mechanism for cutting the double sole thread, when used, upon each revolution of the needle cylinder since the wrap shaft 68 and the needle cylinder are moved in timed relation to each other, namely, a one-to-one ratio as fully disclosed in said Dickens Patent No. 2,278,869.

The lever 98 is biased by a spring 115 to prevent its passing beneath disk 95 when it is lowered to wrap position.

The gap closer 15 has pivotally secured thereto as at 116 a link 117 which is connected to a lever 118 controlled by the pattern drum for oscillating the latch ring and moving the same to gap closing position to close the throat plate gap during reciprocatory knitting, which is conventional. This is normally biased to circular knitting position by means of a tension spring 119 secured to a block 120 on the outturned portion of link 117 and secured to a spring perch 121 mounted on the latch ring.

Figure 2:
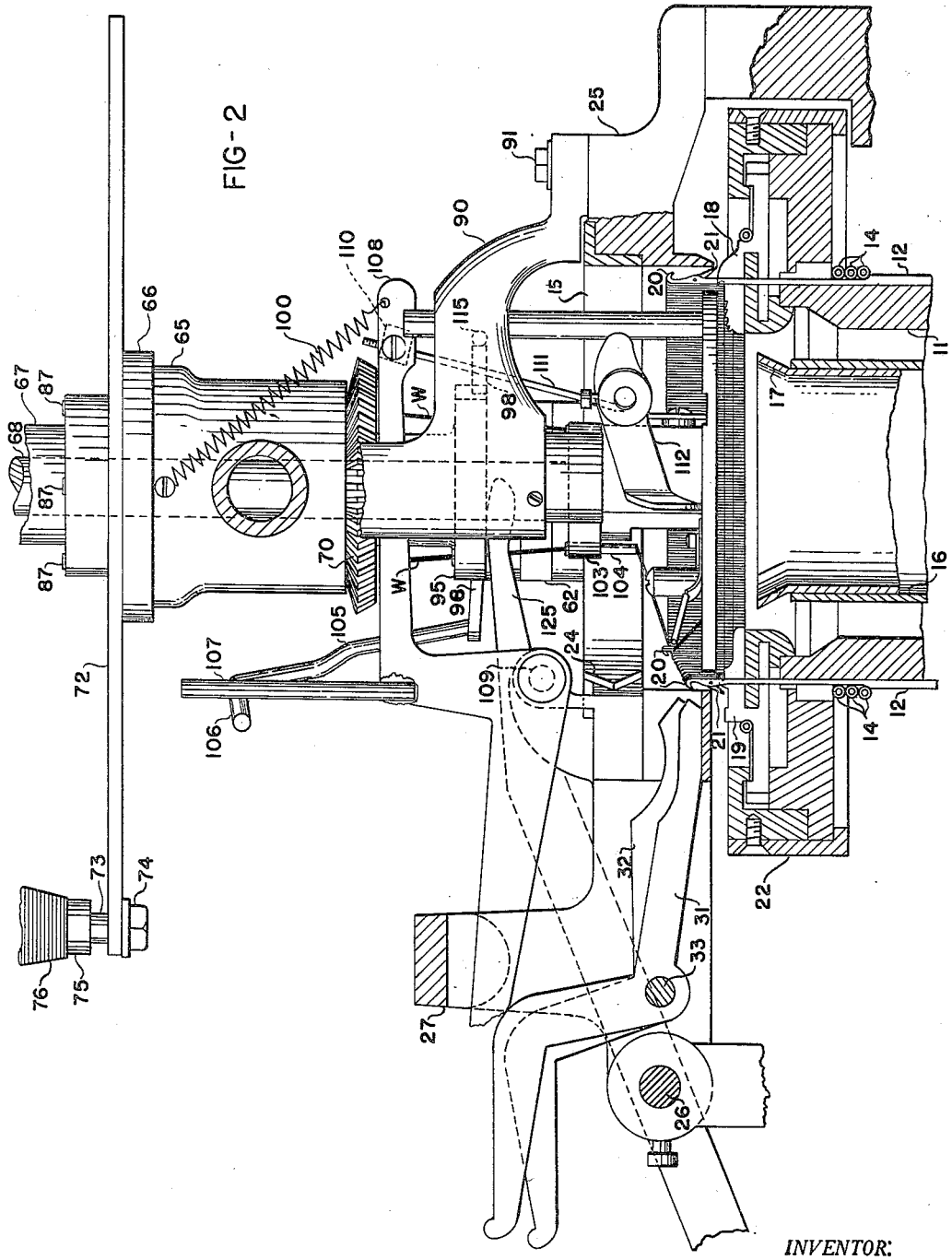
Figure 2 is a view partly in elevation and partly in vertical section and taken substantially at right angles from that in Figure 1 and looking from the left in Figure 1.
Figure 3:
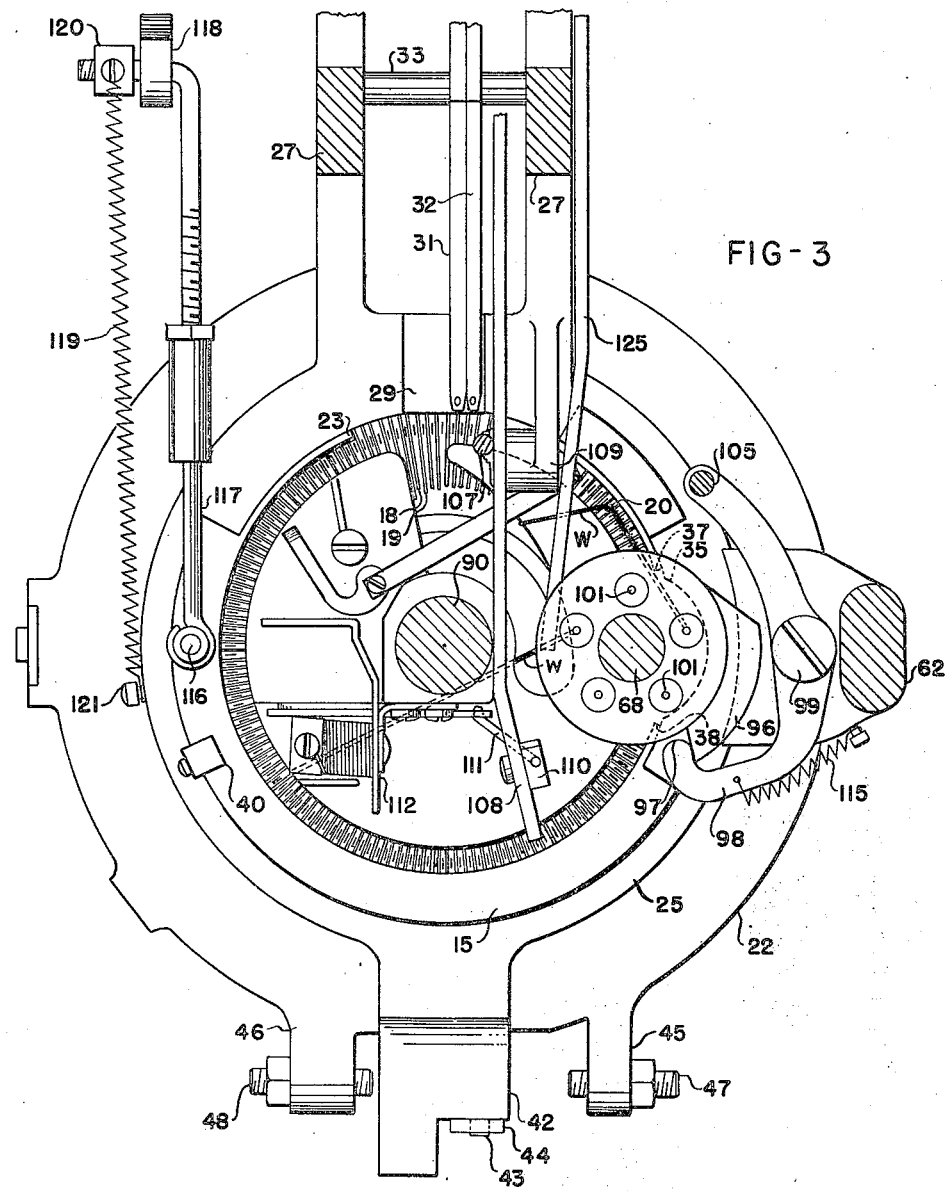
Figure 3 is a sectional plan view taken substantially along the line 3—3 in Figure 1.

The lever 108 is biased to cause it to move in a counter-clockwise direction in Figure 2 by means of a tension spring 190. During reciprocatory knitting such as during heel and toe knitting the wrap shaft 68 and associated parts are raised upwardly by means of a lever 125 having one end disposed below the disk 95 and pivoted as at 26 and which is moved by a conventional push rod operated by the main pattern drum of the machine.

It is to be observed that the saw tooth sinkers 18 are conventional sinkers and each has a nib 130 rising upwardly therefrom and has conventional saw teeth 131 and then is cut away down to a shoulder 132, these sinkers 18 have long butts 133 thereon. The special sinkers by which I control the plating have special nibs 134 with outwardly and downwardly sloping surfaces 135, and have higher backs 136 as contrasted to the lower backs 132 of the sinkers 18.

It is to be noted that the sinkers 19 have short butts 137 thereon and by conventional means such as shown in Figure 23 of Patent No. 1,605,895 these sinkers are so manipulated as to cause the sinkers 18 to be advanced to engage the loops and to hold them during a knitting wave whereas the sinkers 19 are more deeply advanced and the knitting takes place on the outwardly and downwardly sloping surfaces 135 of these sinkers.

Figure 8:
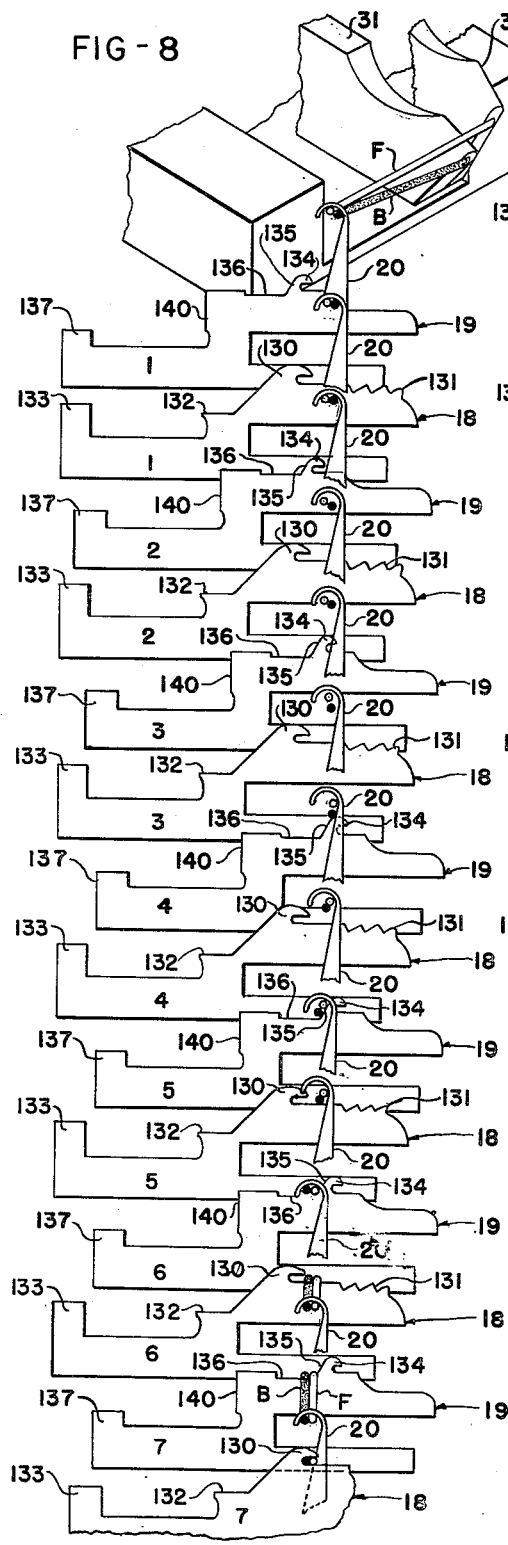
Figure 8 is an isometric developed view showing the progressive operation of the sinkers and needles from the time the yarns are fed and showing the operation of the needles with only a backing and facing yarn in operation.

By referring to Figure 8, it is seen that the backing yarn B is fed under greater tension, the tension means being conventional, but not shown, than the facing yarn F. It will be noted that the position of the yarns B and F remain substantially the same reading from top to bottom for movement of the cylinder equivalent to the space of five needles around the needle circle. It will be noted that the third sinker 19 from the top of Figure 8 is being advanced inwardly as the needle approaches the knitting wave. And the fourth sinker 19 has been advanced inwardly to a reverse plating position before the yarns are brought against the outwardly sloping shoulder 135. The sinkers 18 have not as yet been advanced.

At the fifth saw tooth sinker the needle 20 is pulling the two yarns down the shoulder 135 during the knitting wave. The needles are bringing the two yarns down onto the top of the saw tooth sinkers in advance of the nibs.

At the sixth sinker 19 from the top it is noted that the two yarns have been deposited on the top 136 of the sinker at the base of the sloping portion 135 and that on the sixth saw tooth sinker the yarns have been deposited on top of the sinkers and in front of the nibs and the needles have moved further downwardly during a stitch formation and the seventh sinker 19 after having been fully advanced remains in this position while the loop formation is carried out. At this time the saw tooth sinker 18 will be advanced so that the yarns will be under the nibs of their sinkers so that as the needles raise upwardly they will hold the fabric to cause it to shed the loops.

Figure 8 which has just been described shows how the backing yarn and the facing yarn are slid down the sloping surfaces 135 to cause the backing yarn to remain on the inside of the fabric and the facing yarn under lesser tension will stand on the outside of the fabric, and being under lesser tension than the facing yarn will prevent its being buried in the backing yarn and flattening the backing yarn to allow its edges to show and thus blur or mar the effect of patterning on account of a plating operation.

Figure 9:
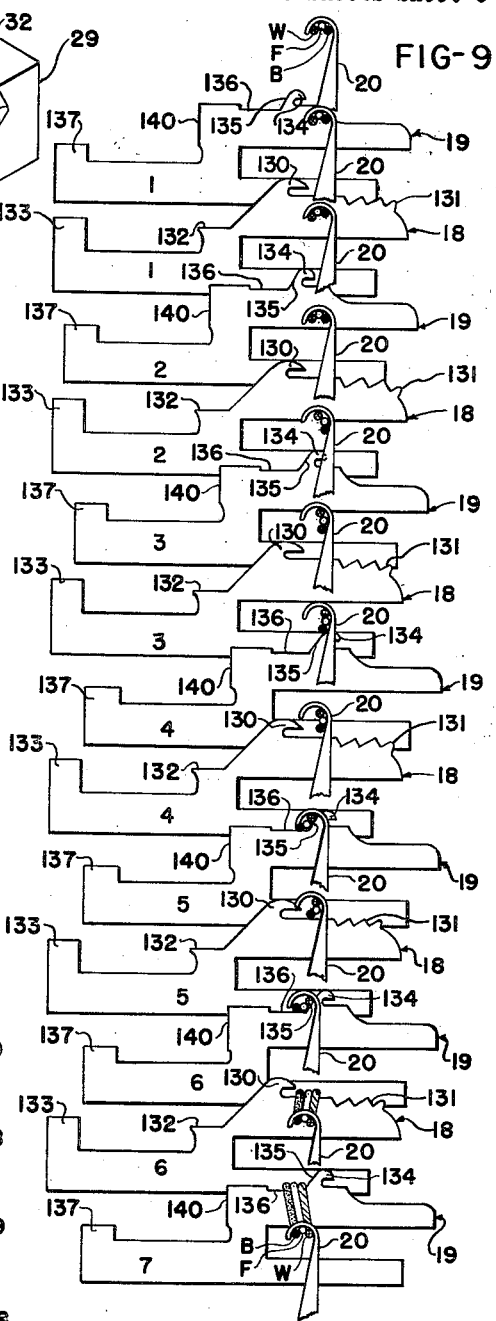
Figure 9 is a view similar to Figure 8 but showing progressively the various steps in a knitting operation when a backing yarn, a facing yarn and a wrap yarn are used in certain stitches.

The description given with reference to Figure 8 is equally applicable to Figure 9 except that in Figure 9 a wrap thread W is also employed. This wrap thread W is also under lesser tension than the backing yarn, being deposited on the outside of the facing yarn it is there seen in step-by-step relation how the needle rolls these three yarns down the sloping surfaces 135 and the backing yarn being fed at a lower point than the facing yarn so the wrap yarn will begin to assume the lowermost position as the needle is lowered at the fourth sinker 19 from the top of Figure 9.

On subsequent steps like at the fifth sinker 19 from the top in Figure 9 the needles will have been further lowered to slide the yarns down the sloping surfaces 135 and they will finally assume a flat position on the top of the sinkers at the base of the sloping surfaces 135 in the seventh sinker 19 from the top in Figure 9, and there it is clear that the backing yarn will be on the inside of the fabric and the facing yarn will be deposited on top of the backing yarn and the wrap yarn will be deposited on top of the facing yarn or on the outside surface of the fabric and the last two yarns being under lesser tension than the backing yarn will cause these to stand out more fully and not bury themselves in the backing yarn, and thus a more clear cut effect of the wrap stripe will be produced just in the same manner as a more clear cut effect of patterning by the facing yarn will be produced in Figure 8.

A sock is illustrated in Figure 10 and is designated at 140. The wrap stripe 141 is produced on each side of the stocking, although it is evident that as many of these vertically disposed wrap stripes can be produced as desired. By varying the needles which take the wrap yarns it is possible to produce a diamond effect 142 in the wrap stripe. This is caused by raising progressively needles in other wales in diverging relation until the full width of the diamond is accomplished and the wrap stripes will be knitted as previously explained in the fabric whereas the needles between the raised needles will be raised later and the wrap thread will be floated across the intervening needles of the diamond portion as indicated at 147. This diamond effect of the wrap stripe is shown in Figure 11. The lines 143 in Figure 10 represent a vertically disposed wale in which the facing yarn is floated behind the needles as at 143 in Figure 11 and allowing the backing yarn only to be knitted which will produce the stripe 143. This is effected in a conventional manner by raising the needles at wales 143 later than the other needles.

The dotted line 145 in Figure 10 indicates a pattern effect by floating the facing yarn back of occasional needles raising such needles later than adjacent needles and thus allowing the facing yarn to appear on the front of the fabric, thus producing intermittent loops up and down the wale in which the facing yarn appears only and the intermediate loops therebetween have the facing yarn at the front of the fabric.

Even though a wrap stitch is formed where there is no reverse type sinker, due to the control of the yarns by adjacent reverse plating sinkers, a more clear cut effect is produced. In Figure 11 the normally plated wales are indicated at 146. Figures 8 and 9 show the manner of forming the loops and show the plating relation of the backing and facing yarn and also show the relation of the wrap yarn in Figure 9 while the loops are being formed. In Figure 15 action of shedding the loops is shown successively and shown the position of the backing and facing yarns after a shedding operation has been completed.

There are several steps shown in Figure 15, step *a* representing the position of the needles in their fully lowered position and ready to be raised. In step *b* the needle has started its rising movement, and in step *c* it has practically completed its upward movement and is ready to receive the new strands of yarn. In step *d* the needle has started its downward movement, and in step *e* the yarns are riding up over the latch in a shedding operation as the needles are lowered, and in step *f* the needles are lowered somewhat more, and in step *g* the loops are being passed off over the tops of the needles, while in step *h* the needle is moving upwardly and completely shedding the loops and so as to engage new strands to form a new course in knitting. It is thus seen how the yarns are placed by the sinkers in Figures 8 and 9 and how this relation is maintained until the loops formed have been shedded by the needles.

The backing and facing yarns, B and F respectively, must have means for regulating the tension and as is herein described, the backing yarn is run under greater tension than the facing yarn. Suitable tension disks 22 and 24 are provided on a suitable pin 28 having nuts 29 thereon for applying the proper compression to a compression spring 30 disposed around the pin 28 for applying the proper tension to the backing yarn B. The other tension means for the facing yarn F is identical to that described and like reference characters will apply with the prime notation added.

The dotted line 145 in Figure 10 is shown more clearly in Figure 11 and there it is shown that about every third course the facing yarn F is floated as at 144, thus in the courses immediately above the floats 144 the backing yarn will show at the front of the fabric as at 147 to thus make a dot with the colored backing yarn to produce the dotted line 145 shown in Figure 10.

It is thus seen that a new method and means has been devised for producing a seamless hosiery fabric having selected pattern effects produced through the manipulation of a plurality of yarns. One patterning effect is produced by conventional float stitch method, but by feeding the two yarns, facing and backing yarns, to the needles in an unconventional manner. A second separate and independent selected pattern may be produced by introducing a third or reinforcing wrap thread to selected needles only, thereby producing a pattern effect in the color of the reinforcing or wrap thread. This mechanism for introducing the reinforcing wrap thread is in all respects similar to the structure shown in Patent No. 1,702,608 of February 19, 1929.

The method by which the wrap or reinforcing thread is caused to appear on the face and being superimposed on either a plain or plated fabric and the method of producing a fabric in which the floated stitch wales are knit more tightly than the conventional knit float stitch wales are closely related. In any knitting machine, such as the Scott and Williams spiral machine, the plain sinkers, which are alternately positioned between the saw tooth sinkers, are replaced with the ordinary Scott and Williams reverse plate sinkers No. 1517. With the conventional five step Scott and Williams plater or sinker reading cam, all the reverse sinkers are moved into a reverse plating position and allowed to run in reverse plating position for the duration of the leg and foot. A normal method of tensioning the facing or spiral finger yarns and allowing the backing yarn to feed to the needles untensioned, is not followed. Instead the backing yarn is fully tensioned while the facing yarn is very lightly tensioned, and due to the reverse sinker action, the spiral finger yarn, although untensioned, shows a complete covering on the face or outside of the fabric, while the fully tensioned backing yarn, which is fed through a finger at a lower level than, and inside of the spiral finger, is reversed by the sinkers to the inside of the fabric. The results of using this method of feeding the facing and backing yarns to the needle are, first, a tightly knit backing yarn stitch wale which is highly desirable in a float stitch pattern, because the backing yarn alone shows in selected areas. Second, the facing yarn without the tension, will lie lightly on the face of the fabric, producing a more complete covering of the backing yarn. A more desirable and decidedly improved contrast between plain plated areas and floated areas is obtained.

With the reverse sinker method of plating, and when a double sole and high splicing reinforcing yarn is introduced in the bottom of the foot, and the reinforcing yarn is fed to the needles through a vibrating finger from outside position opposite to the facing yarn position, a reinforcing yarn will be fed to the needles in a topmost position of all the yarn. The action of the reverse sinkers is to roll over or reverse position of the reinforcing yarn and cause it to become the facing yarn of uniform coverage.

As previously mentioned, the reverse sinker method of fabric plating has a direct bearing on the wrap thread pattern. With the conventional method employed, the wrap threads are introduced to selected needles and must necessarily be the topmost yarn in the hook of the selected needles. This results in the introduced wrap thread becoming covered at least partly by the main feed yarns. When these reinforcing patterns or wrap threads are introduced and knit on the machine employing the reverse sinker method, the yarn in the relative high position in the needle hook, and in this case the wrap threads are rolled over or reversed with the result that a knit fabric is obtained in which the wrap threads are super-imposed upon the face of the fabric in the selected wales and courses in a clear coverage of the main feed yarn. This new method and apparatus produces a tight appearing fabric in the floated areas, a better facing yarn coverage, a greater contrast between floated and non-floated areas, a super-imposed wrap pattern in selected areas which completely covers any one or more of the main feed yarns; it is also possible to run wrap threads with a very light tension, thus eliminating the tight appearing stitch and cutting of the yarns experienced in other methods of wrap plating. It is not necessary in this method to employ a plating horn or other means for positioning the wrap threads in the needle hooks to obtain a clear plated wrap pattern.

Figure 12:
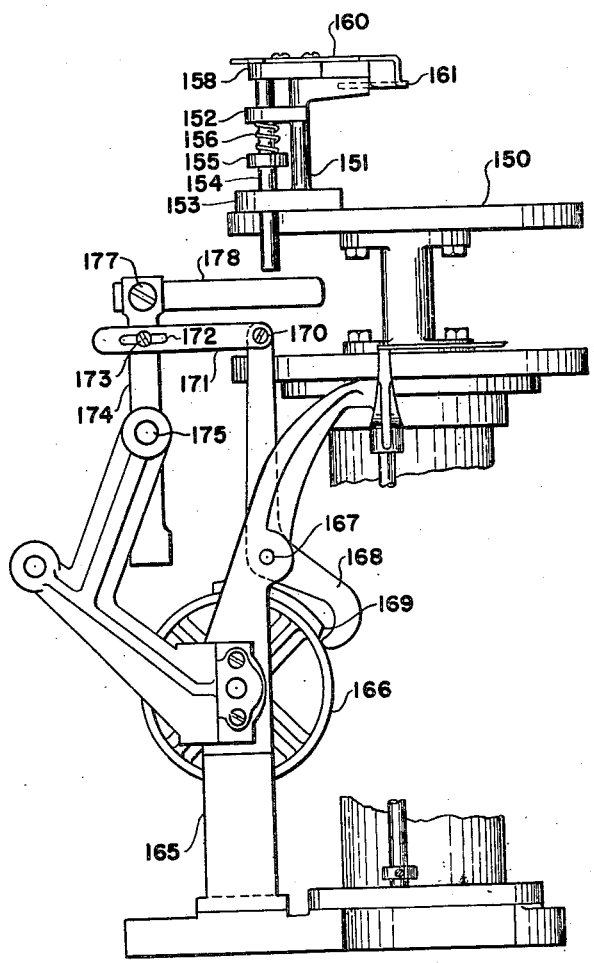
Figure 12 is an elevation showing the controls for the reverse plating sinker cam.

In Figure 12 a bed plate 150 is shown, which is a conventional portion of the machine, and this has mounted on the upper surface thereof a bracket 151 which has projections 152 and 153 in which is slidably mounted a shaft 154. This shaft projects a substantial distance below the bed plate. The shaft 154 has a collar 155 secured thereon which confines a compression spring 156 between collar 155 and projection 152. This normally tends to cause a block 158 secured on the upper end of shaft 154 to rest on top of a bracket 151. Secured to the block 158 is an arm 160 which has a cam portion 161 which projects downwardly for engaging shoulder or butt portion 140 on the reverse plating sinkers 19 for advancing them inwardly, but not all the way inwardly, as they pass into the knitting wave.

When it is not desired that the cam portion 161 be lowered for advancing the reverse plating sinkers it can be raised by suitable mechanism controlled by the pattern drum which is conventional, and one type of mechanism for doing this is depicted in Figure 12. In Figure 12 there is provided a stand or bracket 165 which supports for rotation a main pattern drum 166 which is rotated in step-by-step relation in a conventional manner. This bracket 165 has pivoted as at 167 a lever 168 which is adapted to engage a cam 169 on the main pattern drum of any desired length for holding the cam 161 in elevated position. The upper end of lever 168 has pivoted thereto as at 170 a link 171 having a slot 172 therein penetrated by a pin 173 secured in a link 174 pivoted as at 175 in an arm of the bracket 165. The upper end of link 174 has secured therein as at 177 a bar 178 which is disposed immediately beneath the lower end of the shaft 154. When the lower end of the lever 168 rides onto a cam 169 it moves link 171 to the left in Figure 12 and screw 173 being tightened to clampingly secure the link 171 to link 174, will thus move pivot link 174 in a counterclockwise manner on its pivot 175 which will cause the right-hand end of bar 178 to engage the lower end of shaft 154 and thus will raise the cam member 161 to a position where it will be above the plane traveled by the shoulders 146 of the reverse plating sinkers 19. By referring to Figure 14, it will be observed that the structure therein shown is similar to the structure in Figure 12, Patent No. 2,073,703 to Micks.

It will be observed that the cam member 180 has a cut-away portion 181 on its rear surface. The rear surface of cam 180 engages the front of the butts of the sinkers and the cut-away portion 181 allows only the short butt sinkers 19 to be moved forwardly by cam 161 as it engages the butts 140 of the reverse plating sinkers so that the yarns can be knitted on the sloping shoulders 135 of these reverse plating sinkers. However, the saw tooth sinkers 18 which do not have a shoulder on which knitting takes place, have the high butts 133 and these engage the top rear surface of cam 180 and are held in retracted position, and since they do not have any shoulders in the path of the cam 161, they will not be moved inwardly to their full extent to catch the yarns under their nibs 139.

All of the sinkers, after passing the cams 180 and 161 engage a conventional sloping shoulder 183 on a conventional cam 184 which advances them fully inwardly to cause the sinkers 18 to hold the yarns beneath their nibs so that the needles in rising up through the loops will not carry the loops or fabric along with them, and thus will make possible the shedding of the loops of the fabric.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a knitting machine having a cylinder provided with a plurality of vertically reciprocable needles and also having a throat gap, means in the throat gap for feeding a facing yarn to the needles under relatively light tension and at an elevation substantially above the bottom of the throat gap, other means in the throat gap for feeding a backing yarn to the needles under relatively high tension, and at an elevation above the bottom of the throat gap, but at a lower elevation than the point of feeding the facing yarn, the point of feeding of the facing yarn being in advance of the point at which the backing yarn is fed, and both points of feeding being adjacent the lead side of the throat gap, alternate ones of the needles having conventional saw tooth sinkers for holding the fabric and the other needles having reverse plating sinkers interposed between the saw tooth sinkers, and the reverse plating sinkers each having an outwardly and downwardly sloping shoulder portion, means for feeding a wrap yarn to selected spaced needles under lesser tension than the tension in the facing yarn, means for advancing the reverse plating sinkers inwardly in advance of the saw tooth sinkers during the knitting wave, means for advancing the saw tooth sinkers inwardly at the end of the knitting wave whereby the needles will slide the facing yarn and the backing yarn downwardly along with the wrap yarn at the needles where the wrap yarn will appear, to cause the wrap yarn to appear on the exterior of the facing yarn at the needles where the wrap yarn appears and to cause the facing yarn to appear on the outside of the fabric to cover the backing yarn at those needles where a wrap yarn is not fed thereto.

2. In a circular knitting machine having a rotary cylinder provided with a plurality of vertically movable needles and also having a throat gap, a yarn feed finger disposed near the leading side of the throat gap for feeding a facing yarn to the needles under relatively light tension, said yarn feed finger having a feed eye in its end wall through which the facing yarn is passed, said feed eye being disposed at a point substantially above the bottom of the throat gap, a second yarn feed finger disposed in the throat and on the trailing side of the first feed finger for feeding a backing yarn to the needles under relatively high tension, the second yarn feed finger having a feed eye opening on the outer end wall of the yarn feed finger at a point substantially above the bottom of the throat gap but at a point below the level of the first feed eye, said knitting machine being provided with a plurality of sinkers, alternate sinkers being reverse plating sinkers with outwardly and downwardly sloping shoulders thereon and the other sinkers being conventional saw tooth sinkers, means for feeding wrap yarns across the needle circle to selected needles under lesser tension than the tension in the facing yarn, said knitting machine being provided with conventional means for selectively raising the wrap needles, means for advancing the reverse plating sinkers inwardly during the knitting wave, means for advancing the saw tooth sinkers inwardly during the knitting wave to a less degree than the reverse plating sinkers so that the backing yarn and facing yarn will impinge upon the top of the saw tooth sinkers in advance of the nibs thereof during the knitting wave and the backing yarns and the facing yarns will impinge upon the outwardly sloping shoulders of the reverse plating sinkers during the knitting wave and be slid downwardly to cause the facing yarn to appear next to the nibs of the sinkers, means for fully advancing the saw tooth sinkers to engage the loops formed thereon below their nibs and whereby the wrap yarn will be disposed next to the shoulders of the reverse plating sinkers in a knitting operation to therefore cause the wrap yarn to be on the outside of the fabric at the wrap needles and the facing yarn to be on the outside of the fabric at all other needles.

3. In a circular knitting machine having a throat gap and a needle cylinder provided with a plurality of vertically reciprocable needles and having a plurality of sinkers, alternate sinkers being reverse plating sinkers and the other sinkers being conventional saw tooth sinkers, a yarn feed finger disposed against the lead side of the throat gap and having a feed eye in its end wall disposed a substantial distance above the bottom of the yarn feed finger for feeding a facing yarn to the needles under relatively light tension and a second yarn feed finger disposed against the trailing side of first finger and having a feed eye in its outer end wall disposed a substantial distance above the bottom edge of the second finger but at an elevation which is lower than that of the feed eye in the first yarn feed finger for feeding a backing yarn to the needles under higher tension than that of the facing yarn, means for advancing the reverse plating sinkers inwardly ahead of the saw tooth sinkers to cause the two yarns to be laid on the exterior of the shoulders of the reverse plating sinkers and to be laid on top but in front of the nibs of the saw tooth sinkers and whereby the saw tooth sinkers will engage the fabric beneath its nibs and the facing yarn and backing yarn will be slid down the shoulders of the reverse plating sinkers during the knitting wave to cause the facing yarn even though under less tension to appear on the exterior of the fabric or next to the surface of the shoulders of the reverse plating sinkers.

4. In a circular knitting machine having a throat gap and a needle cylinder provided with a plurality of vertically reciprocable needles and having a plurality of sinkers, alternate sinkers being reverse plating sinkers and the other sinkers being conventional saw tooth sinkers, a first yarn feed finger disposed against the lead side of the throat gap for feeding a facing yarn to the needle under relatively light tension and a second yarn feed finger disposed against the trailing side of first finger and having an end wall provided with an eye disposed above the bottom of the throat gap and at a lower elevation than the feed eye in the first finger for feeding a backing yarn to the needles under relatively high tension, means for advancing the reverse plating sinkers inwardly ahead of the saw tooth sinkers to cause the the two yarns to be laid on the exterior of the shoulders of the reverse plating sinkers and to be laid on top of but in front of the nibs of the saw tooth sinkers and whereby the saw tooth sinkers will engage the fabric beneath its nibs and the facing and backing yarn will be slid down the shoulders of the reverse plating sinkers during the knitting wave to cause the facing yarn even though under less tension to appear on the exterior of the fabric or next to the surface of the shoulders of the reverse plating sinkers.

5. In a circular knitting machine having a throat gap and a needle cylinder provided with a plurality of vertically reciprocable needles and having a plurality of sinkers, alternate sinkers being reverse plating sinkers and the other sinkers being conventional saw tooth sinkers, a first yarn feed finger disposed against the lead side of the throat gap for feeding a facing yarn to the needle under relatively light tension said first yarn feed finger having its end nearest the needle circle terminating in an outwardly and downwardly sloping surface, said first finger having a feed eye whose axis is along one of the radii of the needle circle and disposed near the top of said sloping surface, a second yarn feed finger disposed against the trailing side of first finger for feeding a backing yarn to the needles under relatively high tension and at a point lower than the point of feed of the facing yarn but substantially above the bottom of the throat gap, means for advancing the reverse plating sinkers inwardly ahead of the saw tooth sinkers to cause the yarn to be laid on the exterior of the shoulders of the reverse plating sinkers and to be laid on top of but in front of the nibs of the saw tooth sinkers and whereby the saw tooth sinkers will engage the fabric beneath its nibs and the facing yarn and backing yarn will be slid down the shoulders of the reverse plating sinkers during the knitting wave to cause the facing yarn even though under less tension to appear on the exterior of the fabric or next to the surface of the shoulders of the reverse plating sinkers, a rotary wrap shaft vertically disposed above the machine and driven in timed relation to the cylinder and disposed eccentrically with relation to the cylinder and having a plurality of yarn feed fingers for moving across the circle of needles and feeding wrap threads to selected needles under lesser tension than the tension present in the facing yarn, the wrap threads being adapted to ride down the shoulders of the reverse plating sinkers behind the facing yarn so that the wrap yarn will appear on the exterior of the fabric at those needles where the wrap thread is fed thereto.

6. That method of knitting a stocking on a circular knitting machine having a throat gap which comprises feeding a facing yarn to the needles under relatively light tension at the leading side of the throat gap and at a point near the top of the throat gap and feeding a backing yarn to the needles under relatively high tension at a point on the trailing side of the first feeding point, the backing yarn being fed at a lower level than the facing yarn, but at an elevation substantially above the bottom of the throat gap, both yarns being fed at a point in advance of the beginning of the knitting wave, and the facing yarn being fed at a point in advance of the point of feeding the backing yarn, providing reverse plating sinkers alternately disposed with relation to other sinkers, advancing the other sinkers inwardly to engage the yarns being knitted, advancing the reverse plating sinkers further inwardly than the other sinkers so as to cause the yarns in the knitting wave to fall on the outwardly sloping shoulders of the reverse plating sinkers during the knitting wave to thereby cause the facing yarn to be disposed next to the inside of the needle cylinder whereby it will appear on the outer face of the fabric in a looser manner than the backing yarn which will be knitted under greater tension.

7. Apparatus for knitting a stocking comprising a circular knitting machine having a throat gap and also having a plurality of vertically movable needles, and also having a plurality of sinkers, alternate ones of said sinkers being reverse plating sinkers, means for moving the reverse plating sinkers inwardly in advance of the other sinkers to cause the yarns to be deposited onto and inwardly of the nibs of the other sinkers and onto the exterior of the outwardly sloping shoulders of the reverse plating sinkers, means for feeding a facing yarn to the needles under relatively light tension and at a high elevation relative to the bottom of the throat gap, means in the throat gap for feeding a backing yarn to the needles under relatively high tension and at a lower level than the point of feeding the facing yarn and at a point on the trailing side of the first feeding means whereby during the knitting the facing yarn will slide downwardly on the shoulders of the reverse plating sinkers following the backing yarn which is under higher tension.

8. A circular knitting machine having a throat gap, means for feeding a backing yarn and a facing yarn at the lead side of the throat gap, the backing yarn being fed under greater tension than the facing yarn, the facing yarn being fed at a point in advance of the point of feed for the backing yarn and at a higher elevation than the point of feed of the facing yarn, said machine having alternate sinkers with reverse plating nibs thereon, means for advancing the reverse plating sinkers ahead of the other sinkers so both yarns will be laid on the shoulders of the reverse plating sinkers, means to present a wrap yarn under a lesser tension than is present in the facing yarn to selected needles which also knit the backing yarn and the facing yarn and whereby the wrap stripes appear on the exterior of the fabric with the facing yarn immediately behind the wrap yarn and the backing yarn disposed on the inside of the fabric, and at those portions of the fabric not having the wrap yarn, the backing yarn will be disposed next to the backs of the needles and the facing yarn will appear on the exterior of the finished fabric.

9. In a circular knitting machine having means to feed two yarns in plating relation, at a point in advance of the beginning of the knitting wave, said two yarns comprising a backing yarn and a facing yarn and the backing yarn being fed under greater tension than the facing yarn and at a lower elevation and at a point nearer the beginning of the knitting wave than the point at which the facing yarn is fed, said knitting machine having a plurality of sinkers and every other sinker being a reverse plating sinker, means for advancing the reverse plating sinkers inwardly to a greater degree than the other sinkers and whereby the portions of the backing yarn and facing yarn resting on the reverse plating sinkers will be slid down on the shoulders of the reverse plating sinkers and the other sections of the yarn will be disposed on the other sinkers in front of their nibs before they are advanced and whereby the backing yarn being fed under greater tension and at a lower point than the facing yarn will cause the facing yarn to be disposed on the outside of the fabric, and means for presenting wrap threads to selected needles in addition to the backing and facing yarns and at a lesser tension than is present in the facing yarn so that the wrap thread will be present on the exterior of the fabric to cover the facing yarn and the backing yarns at those needles where wrap threads are knitted, and means for floating the facing yarn at certain loops to cause only the backing yarn to be knitted at those loops.

10. A circular knitting machine having a throat gap and a yarn feed finger for feeding a facing yarn to the needles and having a yarn feed finger to feed a backing yarn to the needles under a greater tension than the facing yarn and at a lower elevation than the point at which the facing yarn is fed, the facing yarn feed finger being disposed at the lead side of the throat gap and the backing yarn being disposed adjacent the exposed side of the facing yarn feed finger, each of the yarn feed fingers having a yarn passageway near the top of its free end and extending inwardly and downwardly towards the needles, said knitting machine having sinkers and some of the sinkers having reverse plating shoulders thereon, means for advancing the reverse plating sinkers inwardly as they approach the knitting wave in advance of the other sinkers in advance of their nibs and on the shoulders of the nibs of the reverse plating sinkers to thereby slide the backing and facing yarns down the shoulders of the nibs of the sinkers to cause the facing yarn to appear on the exterior of the finished fabric and means for feeding a wrap yarn to selected spaced needles in addition to the backing yarn and facing yarn and at a lesser tension than is present in the facing yarn to cause the wrap yarn to appear on the exterior of the fabric and cover the facing yarn at those needles where wrap yarn is fed.

GOLEY R. MARLETTE.

REFERENCES CITED

The following references are of record in the file of this patent:

UNITED STATES PATENTS

| Number | Name | Date |
|---|---|---|
| Re. 16,584 | Lawson | Apr. 5, 1927 |
| 911,656 | Hirner | Feb. 9, 1909 |
| 1,702,608 | Lawson et al. | Feb. 19, 1929 |
| 1,838,994 | Houseman | Dec. 29, 1931 |
| 1,906,204 | Page et al. | Apr. 25, 1933 |
| 1,977,590 | Page et al. | Oct. 16, 1934 |
| 2,000,798 | Swinglehurst, Jr. | May 7, 1935 |
| 2,014,213 | Shields | Sept. 10, 1935 |
| 2,063,026 | Bristow | Dec. 8, 1936 |
| 2,073,703 | Micks | Mar. 16, 1937 |
| 2,076,902 | Lawson et al. | Apr. 13, 1937 |
| 2,082,751 | Lawson et al. | June 1, 1937 |
| 2,278,869 | Dickens | Apr. 7, 1942 |
| 2,436,904 | Shea | Mar. 2, 1948 |